United States Patent [19]
Mock

[11] Patent Number: 5,944,949
[45] Date of Patent: Aug. 31, 1999

[54] METHOD AND APPARATUS FOR SEPARATING ONE OR MORE OPTICAL FIBERS FROM AN OPTICAL FIBER RIBBON

[75] Inventor: George Edwin Mock, Duluth, Ga.

[73] Assignee: Lucent Technologies Inc., Murray Hill, N.J.

[21] Appl. No.: 08/969,200

[22] Filed: Nov. 12, 1997

[51] Int. Cl.$^6$ ................................... B32B 35/00
[52] U.S. Cl. ............................. 156/584; 156/344; 7/107; 29/564.1; 385/135
[58] Field of Search .................... 156/344, 584; 81/9.4, 9.41, 9.42, 9.43, 9.44, 9.51; 385/135; 7/107; 29/564.1, 564.3, 564.4

[56] References Cited

U.S. PATENT DOCUMENTS

| | | | |
|---|---|---|---|
| Re. 28,468 | 7/1975 | Baumgartner et al. | 339/14 L |
| 3,884,276 | 5/1975 | Poplaski | 140/115 |
| 3,920,432 | 11/1975 | Smith | 65/4 |
| 3,984,172 | 10/1976 | Miller | 350/96 B |
| 4,035,211 | 7/1977 | Bill et al. | 156/54 |
| 4,100,003 | 7/1978 | Trusch | 156/54 |
| 4,289,558 | 9/1981 | Eichenbaum et al. | 156/179 |
| 4,310,209 | 1/1982 | Fleming et al. | 339/14 R |
| 4,329,764 | 5/1982 | Sakaue et al. | 29/33 |
| 4,517,718 | 5/1985 | Johnson | 29/33 |
| 4,730,894 | 3/1988 | Arroyo | 350/96.23 |
| 4,896,940 | 1/1990 | Kathiresan et al. | 350/96.23 |
| 4,900,126 | 2/1990 | Jackson et al. | 350/46.23 |
| 4,973,127 | 11/1990 | Cannon, Jr. et al. | 350/96.22 |
| 4,980,007 | 12/1990 | Ferguson | 156/179 |
| 5,076,881 | 12/1991 | Ferguson | 156/436 |
| 5,179,251 | 1/1993 | Mullin et al. | 174/23 C |
| 5,243,675 | 9/1993 | Kathiresan et al. | 385/109 |
| 5,389,192 | 2/1995 | Takimoto et al. | 156/584 |
| 5,460,682 | 10/1995 | Beasley et al. | 156/344 |
| 5,460,683 | 10/1995 | Beasley et al. | 156/344 |
| 5,604,834 | 2/1997 | Beasley, Jr. et al. | 156/584 X |
| 5,643,393 | 7/1997 | Genovese et al. | 156/584 X |
| 5,681,417 | 10/1997 | Jacobs | 156/584 X |
| 5,685,945 | 11/1997 | Mock et al. | 156/584 |
| 5,795,428 | 8/1998 | Beasley, Jr. et al. | 156/584 X |
| 5,830,306 | 11/1998 | Hinson, II | 156/584 X |

FOREIGN PATENT DOCUMENTS 0 246 961   5/1987   France .

OTHER PUBLICATIONS

Modular Ribbon Design For Increased Packing Density of Fiber Optic Cables; Jackson.

Primary Examiner—Mark A. Osele

[57] ABSTRACT

An apparatus for accessing fibers in an optical fiber ribbon by separating the ribbon into first and second portions has a lower element having a slot therein for holding the ribbon, a coupling element to which the lower element is fixedly mounted, and a slotted upper element vertically and rotatably movable on the coupling element. The upper element can be raised to permit insertion of a fiber ribbon into the two slotted elements, after which it is lowered and twisted on the coupling element to separate the ribbon into two parts.

16 Claims, 3 Drawing Sheets

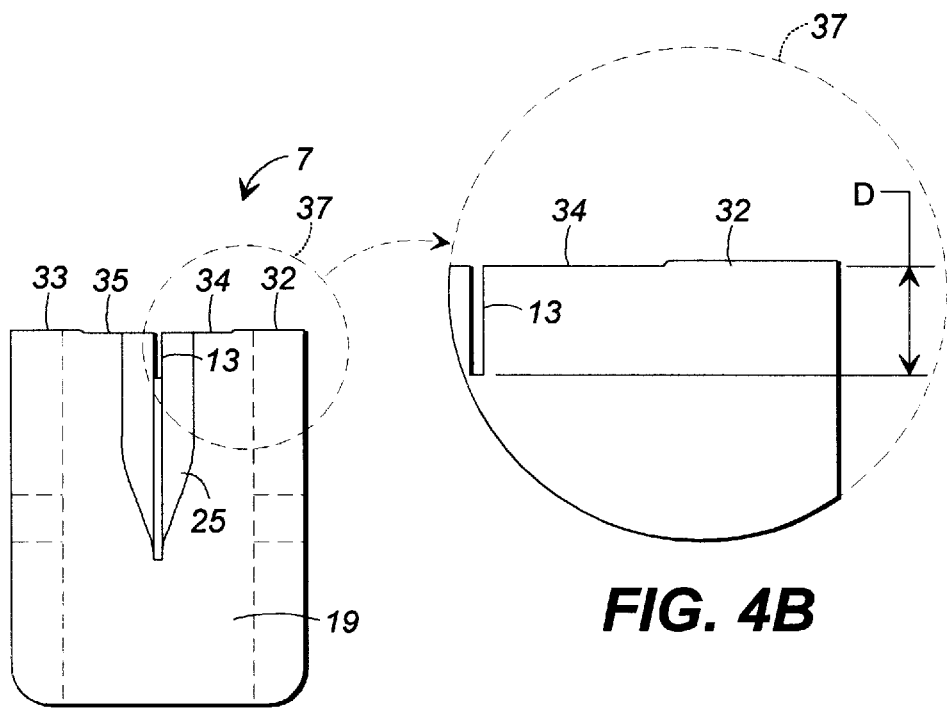
FIG. 4A
FIG. 4B
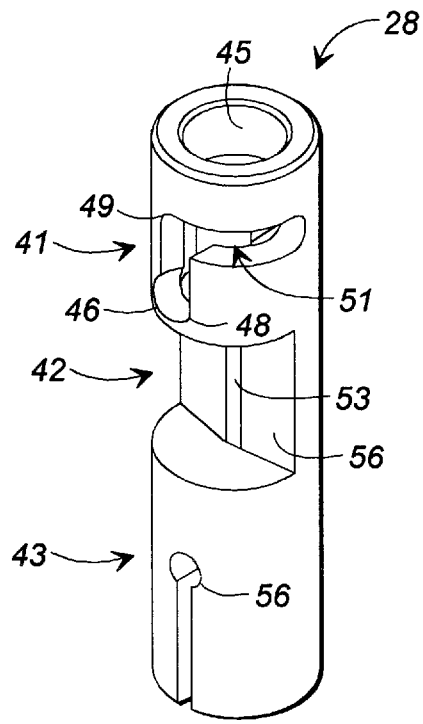
FIG. 5

METHOD AND APPARATUS FOR SEPARATING ONE OR MORE OPTICAL FIBERS FROM AN OPTICAL FIBER RIBBON

TECHNICAL FIELD OF THE INVENTION

The present invention relates to a method and apparatus for splitting optical fiber ribbons and, more particularly, to a method and apparatus for mechanically separating one or more optical fibers from an optical fiber ribbon assembly.

BACKGROUND OF THE INVENTION

Optical fibers are widely use as a signal transmission media. Their popularity stems from their small size and from their large bandwidth capability, which is orders of magnitude greater than electrical conductors However, optical fibers are mechanically fragile and exhibit low strain fracture resistances under tensile loading. In addition, optical fibers cannot be sharply bent. This is because the propagation of light through optical fibers can be seriously degraded by too sharp a bend, and the fiber itself can be fractured by such a bend. The fibers, when assembled into a cable, must be capable of withstanding tensile loads and binding stresses caused when the cable is pulled along its routing and through turns.

Typically, optical fibers are produced and bonded together so as to provide a fiber array or ribbon containing multiple fibers. The ribbon may have any number of fibers, but the fibers are commonly assembled in a co-planar array having four, six, eight, twelve, sixteen, or twenty-four fibers, with a twelve fiber ribbon currently being most prevalent. As the use of such ribbons increases, the number of fibers in the array is also expected to increase, and cables or ribbons with hundreds or thousands of individual optical fibers are possible and even likely to appear in the future. Such ribbons and a method of producing them are described, respectively, in U.S. Pat. No. 4,900,126 to Jackson et al. and U.S. Pat. Nos. 4,980,007 and 5,076,881, both to Ferguson. These patents, of common assignee, and a paper entitled A Modular Ribbon Design For Increased Packing Density Of Fiber Optic Cables, by Jackson et al., are incorporated herein by reference.

As discussed in the above-mentioned references, the multiple optical fibers are typically color-coded and held together by a cladding, or matrix, which secures the fibers in the desired array. The fibers may, however, be easily separated, singly or in groups, as the modulus of the cladding or bonding material is such that interfiber movement is allowed. The fibers can be accessed individually, yet the bonding material provides suitable mechanical properties for the entire array such that the ribbon maintains its bonded state absent a positive attempt to separate fibers from the ribbon.

Methods for separating individual fibers from the array vary, with one method, that of Jackson et al. in U.S. Pat. No. 4,900,126, being described as the application of peeling forces by a craftsperson. While this is easily accomplished when dealing with the end of a ribbon, such an operation is considerably more difficult if the ribbon must be separated at some point between its ends, to cull out one or more fibers for routing elsewhere. Razor blades or knives have been used in the past for this purpose. However, these devices generally lack the required precision when dealing with the close tolerances of the ribbons. Since some or all of the fibers in the ribbon may be in use, or "live", it is extremely important that the fibers not be nicked or cut during separation, which would result in a diminished or total loss of signal.

Another method used for separating individual fibers from the ribbon employs the use of chemical means. Soaking the ribbon in alcohol or another suitable solution can dissolve the matrix or bonding material which secures the fibers together in an array. One particularly disadvantageous result is that the dissolution of the bonding material separates all of the fibers. While individual fibers may now be selected out and routed elsewhere, the separated fibers in the ribbon must then be resecured to ensure the integrity of the remaining fibers. Such resecurement can be unwieldy, at best, and at worst, impossible, depending on the location of the ribbon and/or its environment. In addition, depending on the location of the ribbon and/or the composition of the bonding material holding the fibers together, chemical methods of separation may not be possible or may be hazardous to the ribbon, the serviced equipment, or the technician.

Accordingly, a need exists for a method and apparatus for mechanically separating individual fibers or groups of fibers from a multi-fiber ribbon which is quick and easy to apply and which prevents the fibers from being damaged as they are being separated.

SUMMARY OF THE INVENTION

The present invention provides an apparatus for separating an optical fiber ribbon into a first ribbon portion and a second ribbon portion. Each ribbon portion comprises at least one optical fiber. The apparatus comprises an upper element, a lower element and a coupling device for mounting the upper and lower elements. The upper and lower elements each have an upper surface, a lower surface, a first end surface, and a second end surface. The first and second end surfaces have openings formed therein. The lower surface of the upper element and the upper surface of the lower element each has a slot formed therein for receiving a side of the optical fiber ribbon to be split. The slots extend between the openings formed in the end surfaces of the upper and lower elements.

The lower element is fixedly mounted on the coupling device. The upper element is movably mounted on the coupling device via a guide system. The guide system allows the upper element to be moved vertically along the coupling device between an open position and a closed position. The guide system also allows the upper element to be laterally rotated with respect to the lower element. In the open position, the lower surface of the upper element is located a predetermined distance away from the upper surface of the lower element so that a person can insert a fiber ribbon into the slot formed in the upper surface of the lower element. In the closed position, at least a portion of the lower surface of the upper element abuts at least a portion of the upper surface of the lower element. When the sides of a ribbon are positioned in the slots of the upper and lower elements and the upper element is in the closed position, the ribbon is separated into the first and second ribbon portions when the upper element is rotated on the coupling device. The guide system limits the degree to which the upper element can be rotated in order to prevent the fibers of the ribbon from being damaged and to prevent impairment of signals being carried on the fibers.

In accordance with the preferred embodiment of the present invention, the coupling device comprises a shaft extending through openings formed in the upper and lower elements. The lower element is fixedly fastened to the shaft by a fastening device. The upper element is coupled to the shaft via a guide system, which preferably comprises a pair of slots formed in the shaft and a pin that passes through the upper element and that engages the slots. The slots formed in the shaft are identical in shape and are disposed on opposite sides of the shaft. The pin has first and second ends which are fixedly mounted in opposite sides of the upper element. Each slot in the shaft comprises a vertical section having a lower end and an upper end. In the open position, the pin abuts the upper end of each of the slots formed in the shaft and, in the closed position, the pin abuts the lower end of each of the slots formed in the shaft. Thus, when the upper element is moved up and down, the pin travels up and down within the vertical sections of the slots formed in the shaft. The lower ends of the vertical sections are wider than the upper ends of the vertical sections. This allows the pin to be moved laterally a predetermined amount with respect to the lower element when the upper element is in the closed position and the upper element is rotated with respect to the lower element. Thus, when the upper element is in the closed position and a ribbon is held within the slots of the upper and lower elements, the ribbon is separated into the first and second ribbon portions when the upper element is rotated with respect to the lower element.

In accordance with the preferred embodiment of the present invention, the lower surface of the upper element and the upper surface of the lower element each have a pair of outer ledges and a pair of inner ledges. The outer ledges are adjacent the side walls of the upper and lower elements. The inner ledges define the slots formed in the upper and lower elements. The outer ledges have a height which is greater than the height of the inner ledges such that, when the upper element is in its closed position, the outer ledges of the upper element abut the outer ledges of the lower element to define an empty space between the inner ledges of the upper element and the inner ledges of the lower element that is approximately one half the diameter of a typical fiber. This space reduces or eliminates the possibility of a fiber being sheared during the ribbon separation process.

BRIEF DESCRIPTION OF THE DRAWINGS

FIG. 4A is a side view of the element illustrated in FIG. 3.

FIG. 4B is an enlarged side view of a portion of FIG. 3A showing a longitudinal slot in the element in which an optical fiber ribbon to be separated can be disposed in the lengthwise direction of the ribbon.

FIG. 5 is a perspective view of the center shaft of the optical fiber ribbon-splitting device shown in Figs. 1A and 1B.

DETAILED DESCRIPTION OF THE INVENTION

Figure 1:
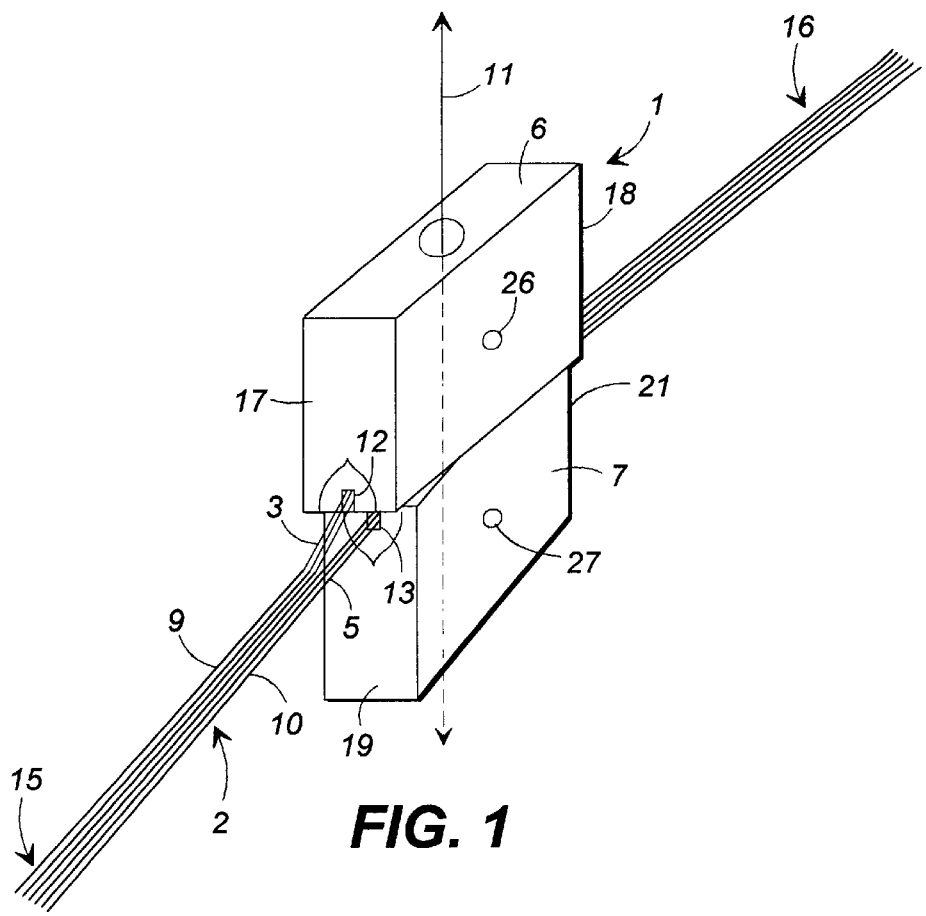
FIG. 1 is a perspective view of the optical fiber ribbon-splitting device of the present invention which shows an optical fiber ribbon which has been separated by rotationally offsetting an upper element of the device from a lower element of the device while opposite sides of the ribbon are positioned within respective slots of the upper and lower elements.

FIG. 1 is a perspective view of the optical fiber ribbon-splitting device 1 of the present invention which shows an optical fiber ribbon 2 which has been separated into an upper ribbon portion 3 and a lower ribbon portion 5. The fiber ribbon 2 is separated by rotationally offsetting an upper element 6 of the device 1 from a lower element 7 of the device 1 while opposite sides 9 and 10 of the ribbon 2 are positioned within respective slots 12 and 13 of the upper and lower elements 6 and 7. The upper element 6 and the lower element 7 of device 1 are disposed about a common axis 11. The upper element 6 is rotationally and axially moveable about axis 11 to allow the upper element 6 to be displaced in the vertical and horizontal directions with respect to the lower element 7.

As shown in FIG. 1, in order to separate an optical fiber ribbon 2, the upper element 6 and the lower element 7 are placed in contact with each other and then the upper element 6 is rotationally displaced in the horizontal direction a slight amount with respect to the lower element 7. This degree of rotational displacement is fixed to prevent the fibers of the ribbon 2 from being damaged during the separation process. The manner in which this degree of rotational displacement is fixed will be discussed in detail below. As the upper element 6 is rotated, opposed horizontal forces are applied to opposite sides 9, 10 of the ribbon 2 by the upper element 6 and the lower element 7, respectively. These horizontal forces cause the ribbon 2 to separate into upper ribbon portion 3 and lower ribbon portion 5, which are held within slots 12 and 13 of upper and lower elements 6 and 7, respectively. Once the ribbon has been separated into upper and lower portions 12 and 13, the ribbon 2 can be separated into upper and lower portions along its entire length by pulling on either of ends 15 or 16 of the ribbon 2.

No tools are required to operate the device 1 of the present invention. The device 1 is intended to be operated by hand by a person, such as a field technician. The field technician simply holds the lower element 7 in one hand and rotates the upper element 6 with the other hand to separate the ribbon 2. The manner in which the device 1 is placed in its open position to allow a ribbon to be placed therein is also accomplished by hand by a person. The manner in which this is accomplished is discussed below with respect to FIG. 2B.

In accordance with the preferred embodiment of the present invention, the upper and lower elements 6 and 7 are identical in structure. This feature of the present invention allows one design to be used for the upper and lower elements 6, 7 of device 1. The many advantages of this feature of the present invention will be apparent to those skilled in the art. One of the many advantages is that a single mold can be created and then the upper and lower elements 6, 7 can be mass produced using the mold to mold the upper and lower elements 6, 7. It should also be noted that the present invention is not limited with respect to the manner in which the device 1 is created or with respect to the types of materials used to create the device 1.

Also, the present invention is not limited with respect to the size of the ribbons with which it can be used. For example, the device 1 can be used to separate a twelve-fiber ribbon into ribbon portions which contain six fibers each. Similarly, the device 1 can be used to separate a twenty-four fiber ribbon into ribbon portions which contain twelve fibers each. However, in order to obtain the best results without damaging any of the fibers in the ribbon, the device 1 should only be used to separate ribbons of the size that the device was designed to separate. For example, if the device 1 is designed with particular dimensions that are suitable for separating twelve-fiber ribbons, the device should not, and probably cannot, be used to separate twenty-four fiber ribbons. This is because the depth of the slots 12, 13 is selected such that when the upper and lower elements 6, 7 are aligned and placed in contact with each other, the fibers of the ribbon 2 will not be "bunched up". Therefore, although the overall dimensions of the device 1 will be the same, regardless of the size ribbon with which the device 1 is intended to be used, the slots 12, 13 will have a greater depth when the device 1 is intended to be used with larger ribbons.

It should also be noted that it is not necessary that the device 1 be used to separate an optical fiber ribbon 2 into even numbers of fibers (e.g., six and six or twelve and twelve). The device 1 can be designed to separate an optical fiber ribbon into any desired number of fibers simply by selecting an appropriate depth for the slots 12 and 13. It will be understood by those skilled in the art the manner in which this can be accomplished in view of the discussion provided herein.

The front end 17 of upper element 6 is identical in structure to the back end 18 of upper element 6. Similarly, the front end 19 of lower element 7 is identical in structure to the back end 21 of lower element 7. Therefore, the fiber ribbon 2 is separated at the back end of the device 1 in the manner shown in FIG. 1 in which it is separated at the front end of the device 1.

Figure 2A:
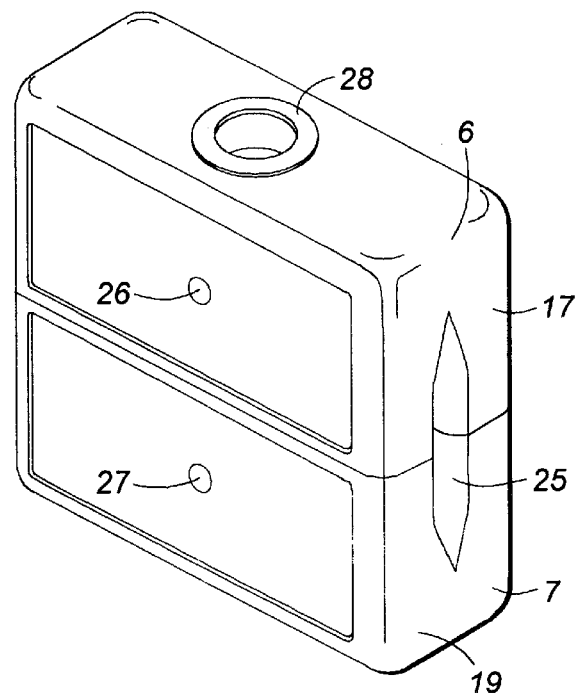
FIG. 2A is a perspective view of the optical fiber ribbon-splitting device of the present invention shown in FIG. 1, wherein the device is in a closed position and the upper and lower elements are aligned in the lengthwise directions of the elements.

FIG. 2A is a perspective view of the optical fiber ribbon-splitting device 1 of the present invention, wherein the device 1 is in a closed position and the upper and lower elements 6 and 7 are aligned in the lengthwise directions. FIG. 2A illustrates the device 1 without an optical fiber ribbon disposed therein. The ends of the slots 12 and 13 shown in FIG. 1 are position within a recess 25 which fans out in the manner shown to prevent the fibers from being overly bent by the ends of the upper and lower elements 6 and 7 when the ribbon 2 is separated. This feature of the device 1 prevents the fibers from being damaged during separation.

The device 1 comprises dowel pins 26 and 27 which are fixedly positioned in openings formed in the upper and lower elements 6 and 7 of device 1. The dowel pins 26 and 27 engage a cylindrical shaft 28 which passes through the upper and lower elements 6 and 7. The shaft 28 is fixed in the lower element 7. The dowel pin 27 in the lower element 7 assists in locking the lower element 7 in a fixed position with respect to the shaft 28. A suitable fastening means (not shown) disposed on the bottom surface of the lower element 7 engages the shaft 28 to lock the lower element 7 in a fixed position with respect to the shaft 28.

Figure 2B:
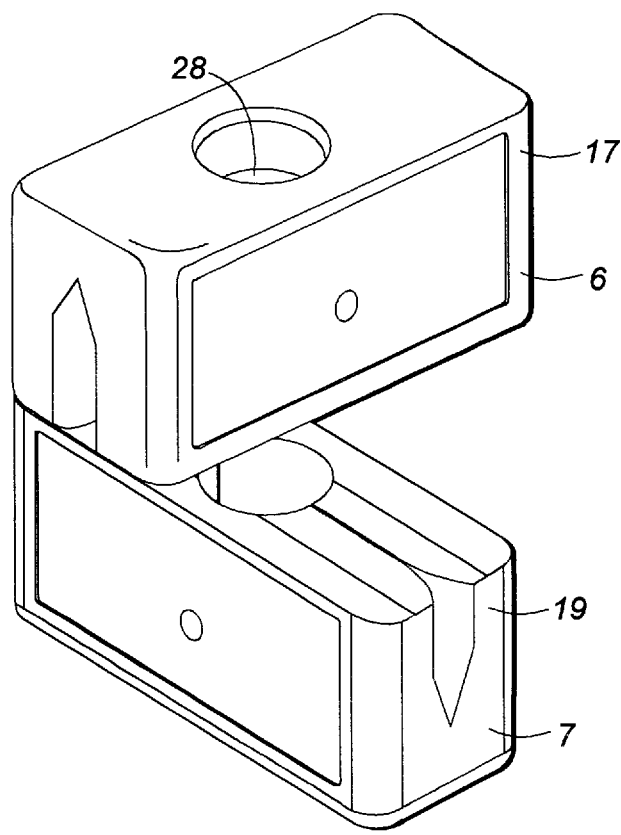
FIG. 2B is a perspective view of the optical fiber ribbon-splitting device of the present invention shown in FIG. 2A, wherein the upper and lower elements are axially separated along a central axis of the device and the upper element is rotationally offset with respect to the lower element so that an optical fiber ribbon to be separated can be positioned within the device.

FIG. 2B is a perspective view illustrating the device 1 of the present invention in its open position. The device 1 is placed in its open position by holding the lower element 7 in one hand and by lifting the upper element 6 with the other hand to cause the upper element 6 to be moved vertically upward away from the lower element 7. Once the upper and lower elements 6 and 7 have been separated, the person simply places a ribbon into the slot 13 of the lower element 7 and moves the upper element 6 vertically downward toward the lower element 7 keeping the upper and lower elements 6 and 7 rotationally aligned so that the slot 12 in the upper element 6 engages the ribbon as the device 1 is placed in the closed position shown in FIG. 2A.

In the open position shown in FIG. 2 B, the field technician can rotate the upper element 6 to move the front end 17 of the upper element 6 away from the front end 19 of the lower element 7. This is to allow the field technician to more easily insert the ribbon into the slot 13 of the lower element 7. The upper element 6 is allowed to rotate a preselected degree about the shaft 28 when the device 1 is in the open position. This degree of rotation is greater than the degree with which the upper element 6 can be rotated in order to separate a ribbon when the device 1 is in its closed position illustrated in FIG. 1. The manner in which the degree of rotation is limited will be discussed below with respect to FIG. 5.

Figure 3:
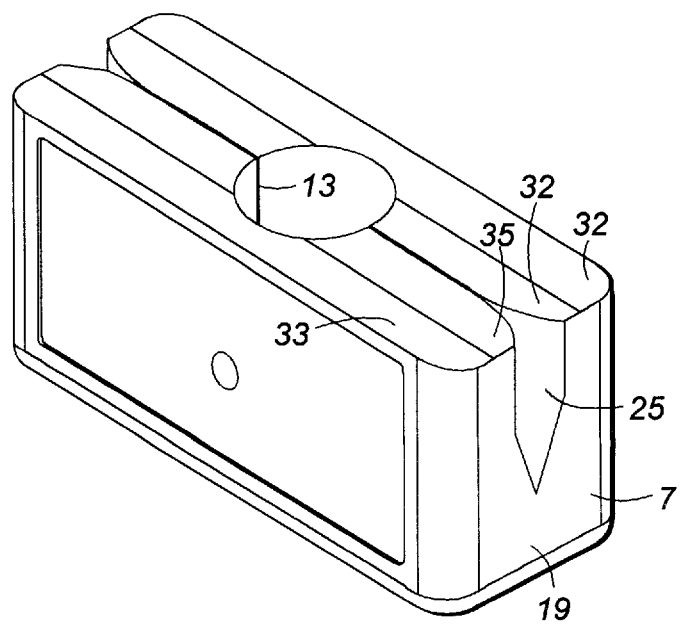
FIG. 3 is a perspective view of the one of the elements of the optical fiber ribbon-splitting device of the present invention.

FIG. 3 is a perspective view of the lower element 7 of the device 1. The slot 13 in the lower element 7 has a preselected depth and extends through the lower element 7 in the lengthwise direction of the lower element 7. The upper surface of the lower element 7 is comprised of raised outer ledges 32 and 33 and lowered interior ledges 34 and 35. The raised outer ledges 32 and 33 are substantially equivalent in height and the lowered interior ledges 34 and 35 are substantially equivalent in height. The lower surface of the upper element 6 (not shown) is substantially identical to the upper surface of the lower element 7. The height of the outer ledges 32 and 33 is slightly greater than the height of the interior ledges 34 and 35. Therefore, when the upper surface of the lower element 7 is placed in contact with the lower surface of the upper element 6 an empty space exists in the interior of the device 1 between the upper and lower elements 6 and 7.

The reason for this space is that it ensures that shearing of one or more fibers of the ribbon will not occur. If no space is provided between the inner surfaces of the upper and lower elements 6 and 7, such that inner surfaces are flush when the device 1 is closed, it is possible that the inner surfaces could both engage the same fiber, which could possibly cause the fiber to be sheared when the ribbon is separated. By providing a space between the surfaces that is approximately one half the diameter of a typical fiber, the forces applied to the ribbon by the upper and lower elements 6 and 7 when separating the ribbon cannot be applied directly to the same fiber, thus reducing or eliminating the possibility of a fiber of the ribbon being sheared during separation of the ribbon. This aspect of the present invention is particularly beneficial when a technician is using the device 1 to separate a ribbon while signals are being carried on the fibers of the ribbon because it ensures that the transmission will not be interrupted. However, it should be noted that it is not necessary, but merely preferable, to design the inner surfaces of the device 1 such that this space is created when the upper and lower elements 6 and 7 are placed in contact with each other. Although this feature of the present invention ensures that shearing of the fibers will not occur during separation of the ribbon, the device 1 may result in satisfactory results without this feature, depending on the preciseness with which the optical fiber ribbons, and the fibers contained therein, are manufactured.

FIG. 4A is an end view of the lower element 7 shown in FIG. 3. As shown in FIG. 4A, the outer ledges 32 and 33 are only slightly greater in height than the inner ledges 34 and 35. FIG. 4B illustrates an expanded view of area 37 shown in FIG. 4A. As shown in FIG. 4B, the slot 13 has a predetermined depth D. As stated above, the depth of the slots 12 and 13 formed in the upper and lower elements 6 and 7, respectively, is designed to separate a particular size ribbon. When the device 1 is designed to separate a ribbon into equal portions, the depth of the slots 12 and 13 will be substantially the same. However, if the device 1 is designed to separate a ribbon into unequal portions, the slots 12 and 13 will have different depths, as will be understood by those skilled in the art. The width of the slots 12 and 13 preferably is the same or slightly greater than the width of the ribbon (i.e., slightly greater than the diameter of one optical fiber), so that a ribbon can be easily placed in the slot.

FIG. 5 is a perspective view of the shaft 28 that engages the upper and lower elements 6 and 7. Preferably, the shaft 28 is made of some type of metal or other rigid substance. The shaft 28 comprises an upper portion 41, a center portion 42 and a lower portion 43. The upper portion 41 has a hollow axial center 45. The upper portion 41 also comprises a vertical slot 46 having a proximal end 48 and a distal end 49. The proximal end 48 of slot 46 is slightly greater in width than the width of the distal end 49 of slot 46. To create this difference in width, the vertical slot 46 is designed such that an increase in width exists in the proximal end 48 on only one side of the slot 46, as shown in FIG. 5. The distal end 49 of slot 46 constitutes an end of a circumferential slot 51 formed in the upper portion of the shaft 28. The vertical slot 46 and the circumferential slot 51 together form a guide system which guides the vertical and rotational movements of the upper element 6 along and about shaft 28. An identical, but oppositely arranged, guide system (not shown) is disposed on the back side of the shaft 28.

The dowel pin 26 shown in FIG. 2A passes through the upper portion of the shaft 28 and is engaged by these front and back guide systems. When the device is in its closed position, the dowel pin 26 rests in the proximal end 48 of vertical slot 46. The width of the proximal end 48 of vertical slot 46 is slightly greater than the diameter of dowel pin 26. This allows the dowel pin 26 to hinge laterally between a home position and an operational position, which, in turn, allows the upper element 6 to be laterally moved from a home position to an operational position when the device 1 is in its closed position. When the device 1 is closed and the upper element 6 is moved from its home position to its operational position, a ribbon disposed within device 1 is split in the manner discussed above with respect to FIG. 1. Thus, the degree of rotation of the upper element 6 when the device is in its closed position is defined and limited by the width and shape of the proximal end 48 of vertical slot 46. This feature of the present invention allows the device 1 to split a ribbon without over bending the ribbon, thereby preventing the fibers in the ribbon from being damaged while also preventing signals being carried on the fibers of the ribbon from being impaired.

When the upper element 6 is raised to its open position, the dowel pin 26 travels vertically along slot 46 until it abuts the distal end 49 of slot 46. Thus, the proximal and distal ends 48 and 49 of slot 46 define the range of vertical movement of the upper element 6.

The center portion 42 of shaft 28 is substantially cut away to define a space for slots 12 and 13 and to provide room for a field technician to insert a ribbon into slot 13 of lower element 7.

The center portion 42 of shaft 28 comprises a middle wall 53 and two adjacent tapered walls 55 and 56 which slightly taper away from the middle wall 53. The purpose for this tapering is to accommodate the bending of the ribbon during the ribbon-splitting process.

The lower portion 43 of shaft 28 comprises a circular opening 57 that receives the dowel pin 27 that passes through the lower element 7 of the device 1. An identical circular opening (not shown) is formed in the back side of the shaft 28 for receiving one end of the dowel pin 27. The purpose for dowel pin 27 and opening 56 is simply to lock the lower element 7 in place to prevent any movement of the lower element 7 with respect to shaft 28. It should be noted that the present invention is not limited with respect to the manner in which the lower element 7 is fixedly positioned to prevent movement thereof with respect to the shaft 28. It will be apparent to those skilled in the art that there are many suitable arrangements for fixedly positioning the lower element 7 with respect to shaft 28. As stated above, preferably the lower element 7 is fastened to the shaft 28 at the bottom surface of the lower element 7 by some suitable fastening means. In this case, dowel pin 27 is not needed. Similarly, if dowel pin 27 is used in the manner discussed above, it is unnecessary to fasten the lower element 7 to the shaft 28 on the bottom surface of lower element 7.

It should also be noted that the present invention is not limited with respect to the arrangement used for allowing the upper element 6 to be vertically and rotationally moved with respect to the lower element 7, in either the open or closed positions, or for limiting the vertical and rotational movement of the upper element 6. It will be apparent to those skilled in the art that many arrangements, other than those specifically described herein, will be suitable for this purpose.

It will be apparent to those skilled in the art that, although the present invention has been described with respect to particular embodiments, the present invention is not limited to these embodiments. It will be understood by those skilled in the art modifications may be made to the embodiments discussed above without deviating from the spirit and scope of the invention.

What is claimed is:

1. An apparatus for separating an optical fiber ribbon into a first ribbon portion and a second ribbon portion, each ribbon portion comprising at least one optical fiber, the apparatus comprising:

an upper element having an upper surface, a lower surface, a first end surface, and a second end surface, the first end surface having an opening formed therein, the second end surface having an opening formed therein, the lower surface having a slot formed therein for receiving a first side of the optical fiber ribbon, the slot extending from the opening formed in the first end surface to the opening formed in the second end surface;

a lower element having an upper surface, a lower surface, a first end surface, and a second end surface, the first end surface of the lower element having an opening formed therein, the second end surface of the lower element having an opening formed therein, the upper surface of the lower element having a slot formed therein for receiving a second side of the optical fiber ribbon, the slot formed in the lower element extending from the opening formed in the first end surface of the lower element to the opening formed in the second end surface of the lower element; and a stationary coupling device, the lower element being fixedly mounted on the coupling device, the upper element being movably mounted on the coupling device such that the upper element is vertically and rotationally movable with respect to the coupling device, wherein when the first and second sides of the ribbon are positioned in the slots of the upper and lower elements, respectively, the ribbon is separated into the first and second ribbon portions when the upper element is rotated on the coupling device.

2. The apparatus of claim 1, wherein the coupling device comprises a shaft extending through openings formed in the upper and lower elements, the lower element being fixedly fastened to the shaft by a fastening device, the upper element being coupled to the shaft via a guide system, the guide system allowing the upper element to be moved vertically towards and away from the lower element between a closed position and an open position, wherein in the closed position a portion of the lower surface of the upper element abuts a portion of the upper surface of the lower element, wherein in the open position a space exists between the upper surface of the lower element and the lower surface of the upper element, the space being of sufficient size to allow a person to insert the second side of the ribbon into the slot formed in the lower element.

3. The apparatus of claim 2, wherein the guide system comprises a pair of slots formed in the shaft and a pin that passes through the upper element, the slots formed in the shaft being identical in shape, the slots formed in the shaft being disposed in the shaft on opposite sides of the shaft, the pin having first and second ends which are fixedly mounted in opposite sides of the upper element, the pin engaging the slots formed in the shaft, each slot in the shaft comprising a vertical section having a lower end and an upper end, wherein in the open position the pin abuts the upper end of each of the slots formed in the shaft and wherein in the closed position the pin abuts the lower end of each of the slots formed in the shaft.

4. The apparatus of claim 3, wherein the lower ends of the vertical sections are wider than the upper ends of the vertical sections such that the pin can be moved laterally a predetermined amount with respect to the lower element when the upper element is in the closed position and the upper element is rotated with respect to the lower element, wherein when the upper element is in the closed position and a ribbon is held within the slots of the upper and lower elements, the ribbon is separated into the first and second ribbon portions when a person rotates the upper element with respect to the lower element.

5. The apparatus of claim 4, wherein the lower surface of the upper element and the upper surface of the lower element each have a pair of outer ledges and a pair of inner ledges, the outer ledges adjacent the side walls of the upper and lower elements, the inner ledges defining the slots formed in the upper and lower elements, wherein the outer ledges have a height which is greater than the height of the inner ledges such that, when the upper element is in its closed position, the outer ledges of the upper element abut the outer ledges of the lower element to define an empty space between the inner ledges of the upper element and the inner ledges of the lower element.

6. The apparatus of claim 5, wherein when the upper element is in the closed position, the inner ledges of the upper element are approximately a distance of one fiber diameter away from the inner ledges of the lower element.

7. The apparatus of claim 6, wherein when a ribbon is separated, the ribbon is separated into the first and second ribbon portions at the first ends of the upper and lower elements and into third and fourth ribbon portions at the second ends of the upper and lower elements.

8. The apparatus of claim 7, wherein each of the slots formed in the shaft comprises a horizontal section, each of the horizontal sections having first and second ends, the first ends of the horizontal sections intersecting the upper ends of the vertical sections, wherein when the upper element is in the open position, the upper element can be rotated such that the pin pivots laterally within the horizontal sections of the slots formed in the shaft.

9. An apparatus for separating an optical fiber ribbon into a first ribbon portion and a second ribbon portion, each ribbon portion comprising at least one optical fiber, the apparatus comprising:

an upper element having an upper surface, a lower surface, a first end surface, and a second end surface, the first end surface having an opening formed therein, the second end surface having an opening formed therein, the lower surface having a slot formed therein for receiving a first side of the optical fiber ribbon, the slot extending from the opening formed in the first end surface to the opening formed in the second end surface;

a lower element having an upper surface, a lower surface, a first end surface, and a second end surface, the first end surface of the lower element having an opening formed therein, the second end surface of the lower element having an opening formed therein, the upper surface of the lower element having a slot formed therein for receiving a second side of the optical fiber ribbon, the slot formed in the lower element extending from the opening formed in the first end surface of the lower element to the opening formed in the second end surface of the lower-element; and stationary means for coupling the upper element to the lower element such that the upper element is vertically and rotationally movable with respect to the lower element, the lower element being fixedly mounted on said means, wherein when the first and second sides of the ribbon are positioned in the slots of the upper and lower elements, respectively, the ribbon is separated into the first and second ribbon portions when the upper element is rotated on the coupling device.

10. The apparatus of claim 9, wherein said means comprises a shaft extending through openings formed in the upper and lower elements, the lower element being fixedly fastened to the shaft by a fastening device, the upper element being coupled to the shaft via a guide system, the guide system allowing the upper element to be moved vertically towards and away from the lower element between a closed position and an open position, wherein in the closed position a portion of the lower surface of the upper element abuts a portion of the upper surface of the lower element, wherein in the open position a space exists between the upper surface of the lower element and the lower surface of the upper element, the space being of sufficient size to allow a person to insert the second side of the ribbon into the slot formed in the lower element.

11. The apparatus of claim 10, wherein the guide system comprises a pair of slots formed in the shaft and a pin that passes through the upper element, the slots formed in the shaft being identical in shape, the slots formed in the shaft being disposed in the shaft on opposite sides of the shaft, the pin having first and second ends which are fixedly mounted in opposite sides of the upper element, the pin engaging the slots formed in the shaft, each slot in the shaft comprising a vertical section having a lower end and an upper end, wherein in the open position the pin abuts the upper end of each of the slots formed in the shaft and wherein in the closed position the pin abuts the lower end of each of the slots formed in the shaft.

12. The apparatus of claim 11, wherein the lower ends of the vertical sections are wider than the upper ends of the vertical sections such that the pin can be moved laterally a predetermined amount with respect to the lower element when the upper element is in the closed position and the upper element is rotated with respect to the lower element, wherein when the upper element is in the closed position and a ribbon is held within the slots of the upper and lower elements, the ribbon is separated into the first and second ribbon portions when a person rotates the upper element with respect to the lower element.

13. The apparatus of claim 12, wherein the lower surface of the upper element and the upper surface of the lower element each have a pair of outer ledges and a pair of inner ledges, the outer ledges adjacent the side walls of the upper and lower elements, the inner ledges defining the slots formed in the upper and lower elements, wherein the outer ledges have a height which is greater than the height of the inner ledges such that, when the upper element is in its closed position, the outer ledges of the upper element abut the outer ledges of the lower element to define an empty space between the inner ledges of the upper element and the inner ledges of the lower element.

14. The apparatus of claim 13, wherein when the upper element is in the closed position, the inner ledges of the upper element are approximately a distance of one fiber diameter away from the inner ledges of the lower element.

15. The apparatus of claim 14, wherein when a ribbon is separated, the ribbon is separated into the first and second ribbon portions at the first ends of the upper and lower elements and into third and fourth ribbon portions at the second ends of the upper and lower elements.

16. The apparatus of claim 15, wherein each of the slots formed in the shaft comprises a horizontal section, each of the horizontal sections having first and second ends, the first ends of the horizontal sections intersecting the upper ends of the vertical sections, wherein when the upper element is in the open position, the upper element can be rotated such that the pin pivots laterally within the horizontal sections of the slots formed in the shaft.

\* \* \* \* \*